United States Patent [19]

Kann et al.

[11] Patent Number: 5,539,026

[45] Date of Patent: Jul. 23, 1996

[54] COMPOSITION FOR IMPROVED CATHODIC DEPOSITION

[75] Inventors: Wolfgang Kann, Sprockhövel; Klausjörg Klein; Hans-Peter Patzschke, both of Wuppertal, all of Germany

[73] Assignee: Herberts Gesellschaft mit beschrankter Haftung, Wuppertal, Germany

[21] Appl. No.: 376,075

[22] Filed: Jan. 20, 1995

Related U.S. Application Data

[63] Continuation of Ser. No. 241,661, May 11, 1994, abandoned, which is a continuation of Ser. No. 120,650, Sep. 13, 1993, abandoned, which is a continuation of Ser. No. 978,195, Nov. 18, 1992, abandoned, which is a continuation of Ser. No. 844,984, Feb. 28, 1992, abandoned, which is a continuation of Ser. No. 405,547, Sep. 11, 1989, abandoned.

[30] Foreign Application Priority Data

Jun. 21, 1989 [DE] Germany ............................ 392021403

[51] Int. Cl.$^6$ .............................. C08K 3/20; C08L 63/02
[52] U.S. Cl. .............................. 523/428; 204/503
[58] Field of Search .................... 523/402, 428; 204/502, 503

[56] References Cited

U.S. PATENT DOCUMENTS

| | | | |
|---|---|---|---|
| 4,356,276 | 10/1982 | Hönig et al. | 523/404 |
| 4,458,054 | 7/1984 | Schmözer et al. | 525/327.3 |
| 4,600,485 | 7/1986 | Patzschke et al. | 523/414 |
| 4,711,934 | 12/1987 | Paar | 523/414 |
| 4,711,935 | 12/1987 | Gmoser et al. | 524/901 |
| 4,732,950 | 3/1988 | Nagai et al. | 523/404 |
| 4,762,903 | 8/1988 | Geist et al. | 528/107 |
| 4,808,658 | 2/1989 | Walz et al. | 524/591 |
| 4,810,535 | 3/1989 | McCollum et al. | 528/103 |
| 4,829,104 | 5/1989 | McIntyre et al. | 523/403 |
| 4,845,170 | 7/1989 | Paar et al. | 524/901 |
| 4,845,171 | 7/1989 | Gmoser et al. | 524/901 |
| 4,865,704 | 9/1989 | Saatweber et al. | 524/901 |
| 4,916,019 | 4/1990 | Nakatani et al. | 523/404 |

FOREIGN PATENT DOCUMENTS

| | | |
|---|---|---|
| 3615810 | 11/1987 | Germany . |
| 3712910 | 10/1988 | Germany . |

OTHER PUBLICATIONS

"Cathodic Electrophoretic ag. Coating Compsn. with low baking temp.", Honig, H. DE 3,615,810.

*Primary Examiner*—Melvyn I. Marquis
*Assistant Examiner*—D. Aylward
*Attorney, Agent, or Firm*—Schweitzer Cornman & Gross

[57] ABSTRACT

An aqueous solution or dispersion of a vehicle for an aqueous cataphoretic coating material, the solution or dispersion containing one or more acid-neutralized, basic, film forming resins, an organic solvent, and a cross linking agent for the film forming resins, the aqueous solution or dispersion being obtained by mixing the following components A) and B):

A) from 95% to 50% by weight solids basis of an aqueous solution or dispersion of one or more, neutralized, basic, film forming resins having a resin solids content of from 25% to 55% by weight, and an organic solvent content of more than 4% by weight, both based on the total solution or dispersion, and a minimum film forming temperature of less than 30° C., and one or more cross linking agents for the film forming resins of the components A) and B), and B) from 5 to 50% by weight solids basis of an aqueous solution or dispersion of one or more acid-neutralized, basic, film forming resins having a resin solids content of from 25 to 55% by weight, and an organic solvent content of less than 3% by weight, both based on the total solution or dispersion, and a minimum film forming temperature of at least 27° C., there being an at least 10° C. difference between the minimum film forming temperatures of the solutions or dispersions A) and B).

12 Claims, No Drawings

COMPOSITION FOR IMPROVED CATHODIC DEPOSITION

This is a continuing application of U.S. Ser. No. 08/241,661, filed on May 11, 1994, which was a continuation of U.S. Ser. No. 08/120,650, filed on Sep. 13, 1993, which was a continuation of U.S. Ser. No. 07/978,195, filed on Nov. 18, 1992, which was a continuation of U.S. Ser. No. 07/844,984, filed on Feb. 28, 1992, which was a continuation of U.S. Ser. No. 07/405,547 filed on Sep. 11, 1989, all now abandoned.

FIELD OF INVENTION

The invention relates to vehicles for aqueous coating materials, which can be deposited at cathode, as well as to these coating materials, which contain an acid-neutralized basic film-forming resin, organic solvents, as well as, optionally, a cross linker for the film-forming resin, conventional enamel additives, pigments and filler. It also relates to the use of the coating materials for coating electrically conductive substrates by cathodic deposition.

BACKGROUND INFORMATION AND PRIOR ART

Electrophoretic enamelling is a well-known method for coating the surface of electrically conductive objects, which may consist, for example, of metal or of conductive plastics or plastics that have been made conductive. In this method, the object to be coated is immersed in an aqueous coating bath and, in the case of cathodic deposition, connected as cathode to a source of direct current. The current flowing causes the coating material or enamel to coagulate and be deposited on the surface of the material. The firmly adhering material is then physically caused to flow by air drying or heating and, if necessary, cross linked chemically in order to produce a homogeneous, smooth, resistant surface.

The method of electrophoretic enamelling also permits cavities, which partly are difficult to reach, to be coated. It is therefore an objective of the optimization of the method to achieve as comprehensive as possible a coating of the cavities. A different objective is to achieve a smooth and homogeneous distribution of layers on the outer surfaces.

Different parameters can be varied in order to meet these requirements. In general, a better throwing power, that is, an improved coating of cavities is to be achieved by increasing the deposition voltage. However, the deposition voltage can be increased only within certain limits, which depend on the vehicle system selected, as otherwise coating disorders in the form of break-throughs which also lead to optically disturbing differences in layer thickness, occur on the sides next to the counterelectrodes of the cathode. One possibility of improving the distribution of thicknesses on smooth substrate surfaces is to increase the deposition temperature. However, it has turned out that the breakthrough voltage of the coating material is also affected negatively by this method. Moreover, because of the coating installations used in industry, there is a certain temperature range, in which it is possible to work with the least possible interventions from the outside and in which the heating or cooling energy that must be employed is most advantageous.

A further parameter is the degree of neutralization of the resin material used. The deposition of enamel is most advantageous if the addition of acid to the coating bath is as low as possible, that is, if the MEQ value (milliequivalents of acid per 100 g of solids) is low. Due to the current flowing, hydroxyl ions are produced at the cathode. These hydroxyl ions then neutralize the dissociated acid molecules present on the micelles of the coating bath. It is therefore understandable that an only slight addition of acid reduces the amount of hydroxyl ions necessary to precipitate the vehicle and that a lower current consumption per quantity of enamel deposited can thus be achieved. At the same time, the throwing power of the coating process is affected positively. The reduction in the amount of acid is limited by the need to produce a stable coating bath, which does not precipitate spontaneously under the conventional operating conditions.

If coagulates are formed, they are also deposited on the enamel surface and interfere with the quality of the film, since these particles no longer merge homogeneously. In addition, the coagulate interferes with other facilities present; for example, filters and pipelines are blocked and ultrafiltration facilities are adversely affected.

A further parameter having an effect on the distribution of layers and the coating conditions is the solvent content of the bath material. By the addition of small amounts of as far as possible organophilic, hydrophobic solvents, the thickness of the layer deposited is increased under the same coating conditions or the coating conditions can be changed in order to achieve a constant layer thickness. In addition, the enamel merges better during the cross linking process. The bath is adversely affected only insofar as the different micelles evidently form coagulates and impurities more easily due to the higher solvent content. These coagulates and contamination must be removed or the stability of the enamel must be increased, for example, by a greater mutual rejection of the particles. This can also be achieved by increasing the neutralization of the micelles.

OBJECT OF THE INVENTION

It is an object of the invention to provide aqueous coating materials, which can be deposited at the cathode, and the application properties of which, such as the throwing power, layer distribution and deposition equivalent, are improved without taking away from the stability of the baths.

SUMMARY OF THE INVENTION

Surprisingly, it has been ascertained that this objective can be accomplished by an aqueous solution or dispersion of a vehicle for an aqueous coating material, which can be deposited at the cathode and which contains an acid-neutralized, basic, film-forming resin, organic solvents, as well as, if necessary, cross linking agents for the film forming resin, and which is characterized in that the acid-neutralized, film-forming resin is present in the form of an aqueous solution or dispersion, which is a mixture of A) 95 to 50% by weight (based on the resin solids) of an aqueous solution or dispersion of one or several, neutralized, basic film-forming resins with a resin solids content of 25 to 55% by weight and with a solvents content of more than 4% by weight, in each case based on the total solution or dispersion, and a minimum film forming temperature of less than 30° C. and B) 5 to 50% by weight (based on the resin solids) of an aqueous solution or dispersion of one or several acid-neutralized, basic, film-forming resins with a resin solids content of 25 to 55% by weight and with a solvents content of less than 3% by weight, in each case based on the total solution or dispersions and a minimum film forming temperature of at least 27° C., the difference between the minimum film forming temperatures of the dispersions A) and B) being at least 10° C.

Within the scope of the invention, it has been ascertained that aqueous coating materials for cathodic deposition, which have a high bath stability and result in an excellent throwing power, good layer distribution and improved deposition equivalents, are obtained if in such baths containing a conventional amount of organic solvents a portion of the vehicle is replaced by addition of an aliquot amount of an aqueous solution or dispersion of a neutralized, basic, film forming resin, which has a particularly low solvent content and a higher film forming temperature.

An important characteristic of the inventive vehicle dispersion is the minimum film forming temperature. This is determined by the following method.

An aqueous solution or dispersion, which has a resin solids content of 25 to 55% by weight, based on the total solution or dispersion, and which has the desired solvent content, is prepared from the basic, film forming resin, on which the dispersion is based, by neutralization with the required amount of acid in fully deionized water. This solution or dispersion is diluted by the addition of fully deionized water to a clear lacquer, that is, one without pigments or fillers, with a solids content of 15 to 20% by weight. The solids content is the weight of the residue obtained from the clear lacquer by stoving at a temperature of 50° C. and is determined, for example, according to the method of DIN 53 216. The solids content is expressed as a percentage of the total weight of the clear lacquer. The clear lacquer, so obtained, is homogenized for one day and not corrected further with additives. Similar substrates, such as steel sheets, which are connected in the circuit as cathode, are then coated at a constant deposition voltage at different temperatures. A steel sheet at a distance of 5 cm can, for example, serve as anode. For this procedure, it is important to keep the deposition voltage constant. However, it s not necessary to specify a particular value for the deposition voltage, as long as this voltage is below the break-through voltage, that is, as long as pore-free films are formed. After stoving, the distribution of layer thicknesses on the substrates is determined. The thickness of the layer is plotted as a function of the bath temperature during the deposition. From the curve obtained, the point, at which the deposited film has a minimum thickness, is determined to be the minimum film forming temperature. If the deposition is carried out at temperatures above the minimum film forming temperature, smooth, uniformly spread surfaces are formed during stoving. The minimum film forming temperature of the solution or dispersion of component A) of the inventive coating material should be below 30° C.

The minimum film forming temperature of the aqueous dispersion of solution of component B) is at least 27° C., preferably at least 30° C. and particularly at least 33° C. The upper limit preferably is as high as 85° C., particularly as high as 75° C. and especially preferably as high as 65° C. Preferred ranges extend from 27° to 85° C., particularly from 30° to 75° C. and especially from 33° to 65° C.

In the inventive aqueous coating materials, the vehicle portion is formed by a mixture of aqueous solutions or dispersions of neutralized, basic, film forming resins. One or several cross linking agents, as required, may be present. The dispersions represent a mixture of a dispersion with a solvent content in excess of 4% by weight and a minimum film forming temperature below 30° C. and a dispersion with a low solvent content below 3% by weight and a higher minimum film forming temperature of at least 27° C. The difference between the minimum film forming temperatures of the two dispersions is at least 10° C.

Resins with the same or a different chemical structure are suitable for the two dispersions. For example, it is possible to admix with dispersion A), which has the high solvent content and the low minimum film forming temperature, an "admixed dispersion" B), which contains a resin that is the same as or a different from the resin of dispersion A). However, the admixed dispersion B) has a reduced solvent content and a minimum film forming temperature, which is at least 10° C. higher.

The admixed dispersion B), which has a particularly low solvent content, can be prepared in the usual manner. The starting dispersion may be a conventional vehicle dispersion, which may also be the same vehicle dispersion as dispersion A). The solvents can be removed in the usual manner from the starting dispersion with the higher solvent content. Azeotropic distillation, for example, is suitable for removing solvents.

For example, dispersions with a particularly low solvent content can be prepared by the method of the German Auslegeschrift 3,712,910. Such a method consists, for example, of preparing a vehicle or vehicle mixture in a solvent, neutralizing, then transferring into the aqueous phase and removing the solvent from the aqueous phase, for example, by azeotropic distillation.

The solution or dispersion component B) has a particularly low content of organic solvents, which are organophilic or not compatible with water. They have a strong effect on the dispersion properties.

It is very advantageous if the admixed dispersions B) furthermore have as low a degree of neutralization as possible. For example, the neutralization may be of the order of 10 to 40 mmoles of acid per 100 g of solids. Examples os such dispersions with a low degree of neutralization are also described in the German Auslegeschrift 3,712,910; they are stable dispersions, which do not settle out.

In general, the vehicle dispersions of the inventive, aqueous coating materials, which consists of the components A) and B), are obtained by mixing the two components A) and B) in the given amounts. For example, admixed dispersion B) preferably is added in such an amount, that it supplies 5 to 50% by weight and preferably 15 to 40% by weight of the resin portion in the electrophoretic bath. The admixed dispersion can be added to dispersion A) immediately during the preparation of the coating material; it may also be added at a later time. The mixture obtained is homogenized rapidly.

After the mixture of A) and B) is prepared, the coating material can be mixed with conventional enamel additives, pigments and/or fillers, with which those skilled in the art are familiar or which are customary in this field. Conventional organic solvents may also be added as enamel additives in order to achieve advantageous coating conditions.

The film forming resins contained in the inventive dispersions A) and B) are conventional, acid neutralized, basic, film-forming resins, similar to those used in the filed of aqueous coating materials, which can be deposited at the cathode. The resins may be present as single resins or as a mixture, that is, one or several resins may be present. The resins may be self cross linking or cross linked by extraneous molecules.

For example, the resins in dispersion A) can be either self cross linking or cross linked by extraneous molecules or mixtures of self cross linking resins and resins cross liked by extraneous molecules can be present. Particularly in dispersion B) are the resins either self cross linking or cross linked by extraneous molecules.

In the event that resins, cross linked by extraneous molecules, are present in the dispersions A) and/or B), conventional cross linkers are added to these dispersions for the resins that are cross linked by extraneous molecules. The cross linkers are those normally used in this field. Those skilled in the art are familiar with them. The cross linkers are added in amounts normally required for the cross linking reaction. Generally, it is advantageous to keep the amount of cross linker below 40% by weight, based on the resins solids content (that is, the sum of the film forming resins and the cross linker). Dispersions A) and B) may contain the required cross linkers, as required. It is also possible that the cross linkers, required for dispersion B), are contained only in dispersion A). Only by mixing dispersions A) and B) are they then supplied to the film forming resins of dispersion B), which are cross linked by extraneous molecules. The curing agents generally are added as resin components already during the preparation of dispersions A) and/or B); accordingly, the quantities of 95 to 50% by weight, given for dispersion A), and of 5 to 50% by weight, given for B), calculated on the basis of the resin solids content, in each case relate to the resin solids formed from the film forming resin and any cross linking agent that may be present.

The neutralizable, basic, film forming resins, used for components A) and B), are conventional resins used in the field of cathodic deposition. Examples of such resins are listed in the following for dispersion component B) as well as for dispersion component A). Examples of cross linkers for such film forming resins, which are cross linked by extraneous molecules, are also listed in the following. In principle, the film forming resins, which are described for component A), can also be used for the dispersion component B) and vice versa. The same is true for the cross liking agents, which are given in the following as examples.

As vehicles for the admixed dispersion B), resins such as those described in the EP-A-82 291 or the German Offenlegungschrift 3,615,810 or the EP-A0 23 43 95 are suitable. They are, for example, aminoepoxide resins, which were prepared with known primary, secondary or tertiary amines. The chemical structure of the aminoepoxide resins and their properties can be varied within wide limits, for example, by the selection of epoxide resins and of the amines used, by changing the amount of the amino and hydroxyl functions, by varying the molecular weight or by changing the proportion of soft or hard segments of molecule.

Hydroxyl group-containing aminoepoxide resins are expeditiously obtained from polyglycidyl ethers with at least one and preferably two 1,2-epoxide groups per molecules. Within the scope of this invention, polyglycidyl ethers are understood to be those having the general formula The polyglycidyl ethers have an average molecular weight of about 300 to 5,000 and an epoxide equivalent weight of about 170 to 2,500. Such resins are reaction products of epichlorohydrin or methylepichlorohydrin and dihydroxydiphenylmethane (bisphenol F) or dihydroxydiphenylpropane (bisphenol A), as well as dihydroxybenzophenone or dihydroxynaphthalene. Polyepoxides with a suitable molecular weight are prepared either by selecting the molar ratio of bisphenol to epichlorohydrin or by reacting the monomeric diglycidyl compound with further bisphenol with addition of catalysts such as Lewis acids or phosphonium salts.

The aminoepoxide resin may also be modified with saturated or unsaturated polycarboxylic acids and/or hydroxycarboxylic acids. (Cyclo)aliphatic and/or aromatic polycarboxylic acids are, for example, adipic acid, sebacic acid, isophthalic acid or dimeric fatty acid; OH-functional alkylcarboxylic acids are, for example, lactic acid, dimethylolpropionic acid or also carboxyl- and hydroxyl-containing polyesters. The reaction of an excess of polyglycidyl ether of low molecular weight with polycarboxylic acids and polyalcohols results in modified polyglycidyl ethers as intermediate. These can then react further with amines or aminoalcohols or mixtures thereof.

Heterocyclic polyepoxide compounds, such as triglycidyl isocyanurate or diepoxides of bisimides can also be used. A further suitable class of polyepoxides are polyglycidyl ethers of phenolic novolak resins, which then can bring about a higher functionality of between two and six glycidyl groups per molecule. By defunctionalizing with substituted phenols, it is also possible to incorporate elasticizing elements, should this prove to be advantageous. Polyglycidyl esters of polycarboxylic acids, such as diglycidyl hexahydrophthalate or diglycidyl fumarate can also be used.

Amino groups are introduced either by the addition of NH-reactive compounds to the epoxide group or also by the reaction of the hydroxyl groups of the base resin with basic monoisocyanates, which are formed by the reaction of aromatic or aliphatic or cycloaliphatic di- or polyisocyanates or mixtures thereof with dialkylaminoalkanols. As NH-reactive compounds, primary monoalkylamines and/or preferably secondary monoamines are used. Compounds of this class of substances are, for example, diethylamine, dimethylaminopropylamine, diethylaminoethylamine, diethanolamine, methylaminoethanol, the diketimine of diethylenetriamine, morpholine or oxazolidine. When primary amines

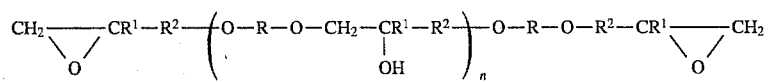

with

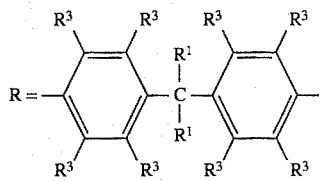

wherein
$R^1$ represents -H and/or -$C_mH_{2m-1}$
$R^2$ represents -$(CR_2^1)_m$, preferably -$CH_2$-
$R^3$ represents $R^1$, halogen or preferably -H
n is o to 8 and preferably 1 to 6
m=1 to 8 and preferably 1.

are used, the amine reacts to enlarge the molecule according to the stoichtometric amounts of epoxide groups available. On the other hand, if secondary diamines are used, such as N,N'-dialkyldiaminoalkane or reaction products of glycidyl esters of a branched monocarboxylic acid with diaminoalkanes in a double molar ratio, there is chain elongation. In this case, saturated or unsaturated glycidyl ethers can also be used as monoepoxides. At the same time, a number of hydroxyl groups are formed automatically through the reaction with the epoxide group; further hydroxyl groups can be incorporated selectively through hydroxylalkylamines. All the amines can be reacted as a mixture with the epoxide groups; on the other hand, a stepwise reaction sequence is also possible.

The molar ratio of epoxide groups to amino groups is selected so that complete incorporation of the amine is assured. Otherwise, coating disorders can occur during the electric deposition. An elevated reaction temperature towards the end of the reaction is therefore advantageous, as is a slight excess of epoxide.

Further examples of suitable resins are described in the EP-A 0 261 385. These resins are obtained by the free radical polymerization of monomers containing olefinic groups. They may optionally contain OH, SH or amino or other functional groups. Monomers of the following general formula are used, for example, as monomers that can be polymerized by free radicals $$R\text{-}CH=CR'\text{-}X\text{-}A\text{-}N(R'')_2$$

wherein
$R=R'$ or $-X-C_nH_{2n-1}$
$R'=-H$ or $-C_nH_{2n-1}$
$R''=-R'$, $-C_nH_{2n}OH$ and/or $-C_nH_{2n}NR_2$
$X=-COO$, $-CONH-$ or $-H$
$A=-C_nH_{2n}-$ or

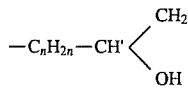

and
$n=1$ to 8, preferably 1 to 4.

Examples of unsaturated N group-containing monomers are N-dialkyl or N-monoalkylaminoalkyl (meth)acrylates, such as, for example, N-diethylaminoethyl methacrylate or N-t-butylaminoethyl acrylate or the corresponding N-alkanol compounds, N-dialkyl- or N-monoalkylaminoalkyl (meth)acrylamide and/or vinyl group-containing heterocyclic compounds with one or more basic nitrogen atoms, such as N-vinylimidazole.

Hydroxyl group-containing compounds, which can be polymerized by a free radical reaction, are understood to be those, which contain, aside from a polymerizable, ethylencially unsaturated group, at least one hydroxyl group on a $C_2$ to $C_{20}$ linear, branched or cyclic carbon backbone. Especially suitable are hydroxyalkyl (meth)acrylates such as 2-hydroxyethyl acrylate, 1,4-butanediol monoacrylate, 2-hydroxypropyl methacrylate, propylene glycol monoacrylate or hydroxyalkyl fumarate. However, N-hydroxyethyl acrylamide or N-(2-hydroxypropyl) methacrylamide can also be used. Other hydroxyl group-containing compounds are allyl alcohol, monovinyl ethers of polyalcohols, such as the monovinyl ether of butanediol, as well as hydroxyl group-containing allyl ethers or esters such as 2,3-dihydroxypropyl monoallyl ether. Particularly suitable are hydroxyethyl, hydroxypropyl and 1,4-butanediol mono(meth)acrylate.

The free radical polymerizable monomers, which contain no reactive groups other than the ethylenically unsaturated bond, are selected on the basis of the compatibility of the resin components and the flow or merging properties of the enamel film. Alkyl acrylates, alkyl methacrylates and/or dialkyl maleates are used. The alkyl groups may be linear or branched aliphatic, cycloaliphatic or aromatic, with 1 to 20 carbon atoms. Monomers, which provide a high glass transition temperature, are, for example, those of the vinylaromatic type, such as styrene, alkylstyrenes such as vinyltoluene, or methacrylate esters with short side chains, such as methyl methacrylate, propyl methacrylate, cyclohexyl methacrylate, methacrylamide or (meth)acrylonitrile. Monomers, which provide a low glass transition temperature, frequently are acrylates with a long chain, such as butyl acrylate or lauryl acrylate.

The polymerization is carried out in a known manner by solution polymerization with addition of free radical initiators and, optionally molecular weight controllers. Preferably, organic solvents are used, which are miscible with water. The components can be used as a mixture. However, they can also be added consecutively. The molecular weight and the glass transition temperature can be affected by the monomer selected, by the controller and by the concentration of the initiator.

Amino(meth)acrylate resins can also be prepared by a polymer-like reaction. For example, it is also possible to use epoxide group-containing, free radical polymerizable monomers, such as glycidyl esters of (meth)acrylic acid or maleic acid or fumaric acid, or glycidyl ethers of unsaturated alcohols, such as vinyl alcohol or allyl alcohol. Other suitable compounds are vinyl or allyl esters of epoxidized fatty acids, such as allyl epoxystearate, or epoxidized diolefins, such as 1-methyl-1-vinylethylene oxide. The proportion of epoxide groups is between 8 and 40% and preferably between 12 and 30%. After the polymerization is completely finished, the reaction with amines can take place. Particularly suitable as amines for the reaction are secondary amines such as dialkylamines with the same of different substituents, such as dimethylamine, diisopropylamine, methylbutylamine, monocycloaliphatic amines such as morpholine or oxazolidine or piperidine or monoalkanolamines or dialkanolamines such as N-methylaminoethanol or diethanolamine, or the diketimine of diethylenetriamine. Examples of primary amines or aminoalkanols are 2-ethylhexylamine or ethanolamine. The primary amines generally are used only in admixture with secondary amines, in order to keep the viscosity of the product low.

The solubility of the vehicle can be affected by the number of amino functions and hydroxyl functions. Likewise, for good cross linking in the film, at least two reactive groups, such as reactive hydroxyl groups and/or reactive amino groups are required in the molecule. The solubility and the cross linking can be controlled by the number of the appropriate molecules in the reaction. The inventive resins have a molecular weight of 1,500 to 30,000 and preferably of 2,500 to 20,000.

The resins can be self cross linking or cross linkable by extraneous molecules. Examples of compounds, suitable as cross linkers, are, for example, blocked polyisocyanates, melamine resins, cross linkers capable of transesterifying or transamidating or cross linkers with terminal double bonds. These cross linkers are well described in the literature; for example triazine-based cross linkers in the German Patent 1,669,593, cross linkers with terminal double bonds in the EP-A 0245 786, cross linkers based on capped isocyanates in Farbe und Lack vol. 89, No. 12, 1983, page 928 ff, and cross linkers capable of transesterifying or transamidating in the EP-A 0 004 090 or the DE-A 34 36 345.

The resins or resin mixtures for the admixed dispersion can be neutralized and transferred into the aqueous phase individually or as a mixture, as well as in the presence of any cross linkers that may be required. After that, a special low-solvent dispersion is prepared, which meets the particular requirements. The resins of the admixed dispersion are selected so that the properties of the enamel film are not adversely affected by the addition. In other words, it is necessary to pay attention to the mutual compatibility of the resins. Moreover, it is necessary to make certain that the cross linking reaction is not interfered with by shifting the proportions of the vehicle components. This can be achieved by integrating a required cross linker in the admixed dispersion. It is also possible to take into consideration or to exchange the respective admixed component in the cross linking ratios. In so doing, it must be noted that the mixtures of the different substances have an effect on the minimum film forming temperature.

In a preferred procedure, the resins of the admixed component B) are selected so that they are of the same type as the resins present in the basic vehicle mixture A). The admixed dispersions can then be added in such a manner that a dispersion B) with the required properties is introduced subsequently into a finished electrophoretic coating bath containing the dispersion A) and then produces a homogeneous bath. According to a different variation, a portion of the vehicle A) is replaced directly by the admixed dispersion B) during the preparation and mixing of the components of the coating bath.

Examples of basic resins of the dispersion component A), used in the coating baths, are described in Patents EP-A 82,291, EP-A-0 234 395 or also EP-A0 209 857. These resins are the conventional aminoepoxide resins, which contain primary, secondary or tertiary amino groups and have an amine number between 45 and 120 (mg of KOH per g of solid resin) and a hydroxyl number of 50 to 500. If the amine number is too high, a lumpy surface results; if it is too low, the solubility of the resin is not high enough. The reactive hydroxyl groups and the reactive amino groups are essential for the cross linking reaction. Their number is at least 2 and preferably at least 4 per molecule. If the degree of cross linking is too low, the films remain sensitive to solvents after the cross linking reaction.

Epoxide resins are also understood to include epoxide group-containing aliphatic or cycloaliphatichydrocarbons, which can be prepared by epoxidizing with per acids. The amino groups are advisably introduced by the addition reaction between NH-reactive compounds and epoxide groups. The NH-reactive compounds should not be used in excess in order to keep contamination and side reactions at a low level.

The vehicles to be used also include polymers, such as those described, for example, in the EP-A-0 261 385. They may be obtained by the copolymerization of glycidyl (meth-)acrylates or allyl glycidyl ethers with unsaturated monomers. Unsaturated olefinic monomers are understood to be, for example, other saturated, linear or branched acrylate or methacrylate esters, styrene, vinyltoluene or also functionalized (meth)acrylate esters. The amino groups, necessary for solubility, can be introduced by the reaction of epoxide groups with secondary amines or aminoalcohols or by grafting (meth)acrylate compounds containing secondary or tertiary nitrogen in the linear or cyclic ester group.

Examples of further vehicles, which can be used in electrophoretic coating baths, are described in the EP-A-0 209 857. These vehicles are reaction products of diphenols, such as bisphenol A or bisphenol F, with primary amines and formaldehyde. These can be reacted with a semi-capped isocyanate as the product of the reaction between an aliphatic or aromatic di- or polyisocyanate and a primary amine. As amine, aliphatic amines or alkanolamines can be used. The reaction products should contain on the average one secondary amino group per molecule. If necessary, the existing OH groups can be reacted with epoxide compounds and/or further isocyanate groups.

The resins may be self cross linking or cross linkable by extraneous molecules. Suitable as cross linking agents are compounds such as triazine resins, blocked isocyanates, cross linking agents capable of transesterifying or transamidating, cross linking agents with terminal double bonds and cross linking agents capable of undergoing a Michael addition reaction with active hydrogen.

Cross linking agents based on triazine are described in the literature, as are cross linking agents with terminal double bonds, for example, in the EP-A-0 245 786. Suitable isocyanate compounds are described, for example, in Farbeund Lack, vol. 89, No. 12, 1983, page 298 ff. They are the usual di- or polyisocyanates based on aliphatic and/or aromatic isocyanates or mixtures thereof, which are reacted with known blocking agents, such as alcohols, phenols, oximes, hydroxymethacrylates or alkanolamines.

Cross linking agents based on compounds with acidic CH groups are described, for example in the German Auslegeschrift 3,324,211. They are derivatives of mono- or dicarboxylic esters, which can react with double bonds capable of entering into a Michael addition reaction. Cross linking agents of the transesterification type are described in the German Auslegeschrift 3,436,345. They react readily with compounds, which have reacted hetero atoms carrying active hydrogen atoms, such as OH-, SH- and NH- groups, into the vehicle. They can also cross link through reaction with carboxylate esters or amides.

The resins can be used as individual components or as a mixture. As solvent containing resins, they are neutralized with the required amount of conventional acids, such as formic acid, acetic acid, phosphoric acid, lactic acid or citric acid and, after addition of pigments, additives and auxiliaries, which may be required, are transferred into the aqueous phase. This coating bath is then adjusted with fully deionized water to the desired solids content. A different, preferred possibility consists therein that the vehicle, after being neutralized, is converted by a known procedure into a vehicle dispersion. To this dispersion was added as second component a pigment paste, which consists of a mill base of a ground vehicle with the pigments, fillers, additives, acids and further auxiliaries. The amount of acid required in each case is to be determined simply by experiment.

The dispersions A) and B), contained in the inventive vehicle dispersions, have a solvent content of more than 4% by weight and less than 3% by weight respectively. These solvents are ones that were used in the preparation of the resins and have subsequently remained in the resins. At room temperature, they are not miscible in every ratio with water. They can thus be solvents, which are partly miscible with water or solvents, which are not at all miscible with water. Examples of such solvents are aliphatic and aromatic hydrocarbons, alcohols with a boiling point of 130° to 220° C., such as n-amyl alcohol, isoamyl alcohol, t-amyl alcohol, 1-hexanol, 2-ethyl-1-hexanol, cyclohexanol; esters with a boiling point of 75° to 150° C., such as n-propyl acetate, isopropyl propionate, t-butyl acetate, pentyl acetate, hexyl acetate and cyclohexyl acetate; glycol ethers; ketones with a melting point of 80° to 170° C., such as methyl n-propyl ketone, methyl isobutyl ketone, ethyl isopropyl ketone, diisopropyl ketone, methyl isobutyl ketone, ethyl n-butyl ketone, diisobutyl ketone, methyl isoamyl ketone and cyclohexanone.

The inventive coating compositions can be improved, if necessary, by known means. Metallically conducting substrates can be coated by known methods in these baths. The advantageous coating properties are not adversely affected by the usual improving auxiliaries. After they are cut off, the electrophoretic enamel coatings are processed further in the usual manner. They can be cross linked by known methods, for example, by heating to elevated temperatures and then provided with additional subsequent coatings. It is furthermore possible to subject the substrate to be coated, before the cross linking reaction, with a subsequent coating and to then subject two or more coatings simultaneously to a cross linking process.

The coated parts or workpieces are distinguished by a surface of high quality. Moreover, they function well in corrosion protection.

Clear advantages result in the coating bath due to the inventive combination of dispersions A) and B). On the one hand, an increased stability of the bath and an advantageous value in the degree of neutralization required are observed. This behavior leads to a better deposition equivalent of the enamel, since a smaller amount of the acid added has to be neutralized in order to coagulate the enamel on the substrate that is to be coated. This results in a lesser current flow and less heating of the coating bath. Accordingly, the cooling capacity required to keep the bath at a constant temperature is reduced, so that energy is saved during the coating process.

In addition, a better behavior of the layer thickness distribution is to be noted, that is, only a slight deviation from the average layer thickness is to be observed on a coated surface. As a result, irregularly shaped parts, which therefore have a varying distance from the counter electrode in the coating bath, have a more homogeneous surface with a uniform layer. A further advantage may moreover be observed in a clearly improved throwing power behavior. With that, for example, surfaces that are not readily accessible are coated better. Layers of higher thickness occur at these places and, in addition, the coated surface is extended into the cavity. This results in a more advantageous behavior in corrosion protection.

A coating material of the pure admixed dispersion with the usual additives proves to be less suitable, since the vehicle micelles present in the bath can be improved and adjusted to the desired coating parameters only little with the usual solvents. The desired effect can also not be achieved if the vehicle portion is taken into consideration at the beginning already as solvent form or is added later on in neutralized form or is used in the form of a conventional aqueous dispersion which, as exclusive vehicle or vehicle mixture, is affected in a known manner by slight amounts of added solvents. There should be a difference of at least 10° C. between the minimum film forming temperatures of the base resins and of the admixed dispersions.

All the percentages given refer to percentages by weight. The solids content is determined at 150° C. as in DIN 53 216.

PREPARATION OF COMPONENT A

In the following examples of the preparation, the minimum film forming temperatures were determined as follows.

The solutions obtained were in each case neutralized and diluted with water to a resin solids content of 15 to 20% by weight. The procedure given in the specification section was then followed.

Preparation Example A

As described in the European Patent 12,463, 391 g of diethanolamine, 189 g of 3-(N,N-dimethylamino)-propylamine and 1,147 g of an adduct of 2 moles of 1,6-hexadiamine and 4 moles of the glycidyl ester of versatic acid (Cardura® E 10 from Shell) are added to 5,273 g of bisphenol A epoxide resin (epoxide equivalent of about 475) in 3,000 g of ethoxypropanol. The reaction mixture is stirred for 4 hours at 85° to 90° C. and then for 1 hour at 120° C. The product is subsequently diluted with ethoxypropanol to a solids content of 60%. The minimum film forming temperature is 19° C.

Preparation Example B

The procedure of Example A is repeated according to the European Patent 12,463, Example 1b. Before being diluted, the resulting reaction product is cooled to 80° C. and mixed with a solution of 10 g of an inhibitor in 755 g of a 50% solution of butoxymethacrylamide in butanol. It is heated slowly in one hour to 120° C. and held at this temperature for 3 hours. During this time, butanol is distilled off under vacuum. After that, the product is diluted with methoxypropanol to a solids content of 65%. The minimum film forming temperature is 22° C.

Preparation Example C

An epoxide resin based on bisphenol A (2,262 g with an epoxide equivalent weight of about 260) is dissolved in 2023 g of diethylene glycol dimethyl ether at 60° to 70° C. and, after addition of 0.8 g of hydroquinone and 2,453 g of a half ester of tetrahydrophthalic anhydride and hydroxyethyl methacrylate, is heated to 100° to 110° C. The temperature of 100° to 110° C. is maintained until the acid number has fallen to below 3 (mg of KOH/g). The reaction product is then reacted with 3262 g of a 70% solution of a monoisocyanate from toluylene diisocyanate and dimethylethanolamine (molar ratio of 1:1) in diethylene glycol dimethyl ether until an NCO value of zero is reached. The minimum film forming temperature is 25° C.

Preparation Example D

Bisphenol A (228 g, 1 mole) is reacted with 260 g of diethylaminopropylamine (2 moles) and 66 g of paraformaldehyde (91%; 2 moles) in the presence of 131 g of toluene as azeotropic entraining agent until 42 g of reaction water have been removed. After the addition of 152 g of diethylene glycol dimethyl ether and lowering the temperature of the product to 30° C., 608 g (2 moles of a toluylene diisocyanate, half blocked with 2-ethylhexanol, are added within 45 minutes. When the NCO value practically has reached zero, 1,400 g of this solution are mixed with a solution of 190 g of epoxide resin based on bisphenol A (epoxide equivalent weight of about 190) and 250 g (1 mole) of a glycidyl ester of a saturated tertiary $C_9$ to $C_{11}$ monocarboxylic acid in 389 g of diethylene glycol dimethyl ether and reacted at 95° to 100° C. until an epoxide value of zero is reached. The minimum film forming temperature is 30° C.

Preparation Example E a) The monocarbonate of an epoxide resin based on bisphenol A (832 g with an epoxide equivalent of 180, Epikote 828) is mixed with 830 g of polycaprolactandiol (CAPA 205) with an OH number of 135 and 712 g of diglycol dimethyl ether and caused to react at 70° to 140° C. with approximate 0.3% $BF_3$ etherate, until an epoxide number of 0 is reached. To this product (solids content of 70%, 2 equivalents of carbonate) are added at 40° to 80° C. in the presence of 0.3% zinc acetylacetonate as catalyst 307 g of a reaction product from 174 g of toluylene diisocyanate (2 equivalents of NCO) and 137 g of 2-ethylhexanol with addition of 0.3% benzyl trimethylammonium hydroxide (Triton B) with an NCO content of about 12.8%. The reaction is continued until the NCO content reaches a value of zero. The concentration is then adjusted with diglycol dimethyl ether to about 70% solids.

b) To 1.759 g of a biscarbonate based on an epoxide resin based on bisphenol A with an epoxide equivalent of approx. 475 (Epikote 1001®) at 60° to 80° C., 618 g of a reaction product from 348 g of toluylene diisocyanate (80% 2,4 isomer; 20% 2,6 isomer) and 274 g of 2-ethylhexanol with addition of 0.3% benzyl trimethylammonium hydroxide as catalyst with a residual NCO content of 12.8% are added slowly in the presence of 0.3% Triton B® as catalyst. The reaction is continued until an NCO value of approximately zero is reached. The product has a solids content of 70%.

c) To 860 g of bishexamethylenetriamine dissolved in 2,315 g of methoxypropanol at a temperature of 20° to 40° C., the product of the reaction of 137 g of 2-ethylhexanol and 174 g of toluylene diisocyanate in the presence of benzyltrimethylammonium hydroxide as catalyst (0.3%) (NCO content of approximately 12.8%) is added. The reaction is allowed to continue until an NCO content of approximately zero is obtained. Reaction product b) (4,737 g) and 3,246 g of reaction product a) (in each case as a 70% solution in diglycol dimethyl ether) are added and caused to react at 60° to 90° C. The reaction is terminated when the amine number reaches a value of about 32 mg of KOH/g. The resulting product has a solids content of 60% and a minimum film forming temperature of about 21° C.

Preparation Example F

Trimellitic anhydride (768 g) and 2,000 g of a glycidyl ester of a tertiary $C_{10}$ monocarboxylic acid branched at the alpha carbon atom (Cardura E10®) are carefully heated with stirring to 190° C. An exothermic reaction commences at 90° C. After that, the product is cooled to 140° C. and mixed with 2.75 g of N,N-dimethylbenzylamine. The reaction mixture is maintained at 145° C. until an acid number of less than 3 is attained. If necessary, a calculated amount of Cardura ® E10 is added in addition. The reaction product is diluted with 2-butoxyethanol to a solids content of 80%.

Preparation Example G

A reaction product (498 g) from 1 mole of tris(hydroxymethyl)aminomethane and 1 mole of n-butyl acrylate is dissolved in toluene to form a 50% solution and reacted at a temperature between 25° C. and 40° C. under adequate cooling with 174 g of toluylene diisocyanate, which is added in portions. At the end of the reaction, the NCO content is practically zero. After heating to 70° C., 60 g of paraformaldehyde and 0.01% triethylamine are added and the temperature is increased, until the water of reaction (1 mole per mole of formaldehyde) is distilled of azeotropically. After cooling, 1,064 g of a half-capped isocyanate from hydroxyethyl methacrylate and toluylene diisocyanate (molar ratio of 1:1) are added and reacted until the NCO content reaches a value of zero. The toluene is then distilled off and the residue diluted with diethylene glycol dimethyl ether to a solids content of 75%.

Preparation Example H

To 431 g of a solution (75% in ethyl acetate) of a reaction product of 3 moles of toluylene diisocyanate and 1 mole of trimethylolpropane (Desmodur L®) at 70° C., 160 g of caprolactam are added slowly with stirring. The reaction mixture is then maintained at 70° C., until the NCO content has fallen to practically zero. 2-Butoxyethanol (204 g) is then added and the ethyl acetate is distilled off over a column until the solids content reaches a value of 70%.

PREPARATION OF COMPONENT B

Example A1

A resin is prepared according to the method of Example A of the German Auslegeschrift 3,712,910 with the proviso that xylene is used as solvent. This product is treated with an appropriate amount of acid and transferred into the aqueous phase. The solvent is then distilled off azeotropically. The solvent content is about 0.5%. The minimum film forming temperature is about 41° C.

Example B2

A resin is prepared in xylene as the main solvent according to the method of Example B of the German Auslegeschrift 3,712,910. After converting the vehicle through neutralization and dilution with water into a dispersion, the solvent is distilled off azeotropically. The residual solvent content is about 2%. The minimum film forming temperature of a clear lacquer is 33° C.

Example I3

In a reaction flask with stirrer, dropping funnel and reflux condenser and under an inert gas, 972 g of ethoxypropanol and 1,957 g of an epoxide resin based on bisphenol A, with an epoxide equivalent weight of 471 g, is dissolved by heating to about 50° C. After addition of 210 g of diethanolamine, the temperature is maintained for about 2 hours at 50° C., whereupon 102 g of dimethylaminopropylamine are added. Using the exothermic heat of reaction, the temperature is raised to 120° C. and this temperature is maintained for 3 hours with stirring. The aforementioned vehicle (2270 g) is heated to 55° C., neutralized with 43.3 g of formic acid (85%) and diluted with 2,970 g of water to a solids content of about 35%. The ethoxypropanol was largely removed by azeotropic distillation, under vacuum where necessary. The product is subsequently diluted with distilled water to a solids content of about 25%. The solvent content (ethoxypropanol) is about 2.5%. The minimum film forming temperature is 40° C.

Example E4

A vehicle is prepared by the method of Example E. A portion of the solvent is distilled off under a good vacuum. The product is neutralized with 40 MEQ of formic acid and converted with fully deionized water into a dispersion with a solids content of 30%. From this suspension, successive 200% ultrafiltrates are then withdrawn with conventional ultrafiltration equipment and filled up again in each case with fully deionized water. The solvent content is about 1%. The vehicle has a minimum film forming temperature of 38° C.

Pigment Paste P1

A vehicle (100 g, 80%) is intimately mixed with 3.7 g of formic acid and 240 g of fully deionized water according to the method of Example 5 of the EP-A-0 183 025 and a clear lacquer is prepared. This is mixed homogeneously with 400 g of titanium dioxide, 372 g of kaolin, 7.5 g of carbon black, 12.5 g of dibutyl tin oxide and 8 g of lead oxide and adjusted to a suitable viscosity with 465 g of water. The solids content of the pigment paste is approximately 55%. This paste is then ground in a bead mill to the required fineness of grain.

Enamel Formulations

Various resins (solid/solid) are mixed and blended homogeneously with an amount of acid. They are then converted with fully deionized water into a dispersion. The solids content should be about 30%. The amount of acid can be calculated from the MEQ value (mmoles of acid/100 g of solids). To 2,000 g of these formulations, 600 g of a pigment paste of Example P1 are added slowly with stirring and diluted with fully deionized water to a bath solids content of 18%.

|    | Resins   | Ratio       | MEQ | mmoles Acid per 100 g of Solids |
|----|----------|-------------|-----|----------------------------------|
| 1. | A:C:F    | 60:20:20    | 34  | formic acid                      |
| 2. | A:C:G    | 60:25:15    | 29  |                                  |
| 3. | B:H      | 80:20       | 35  |                                  |
| 4. | A:C:G:H  | 50:30:10:10 | 32  |                                  |
| 5. | D:A      | 60:40       | 29  | acetic acid                      |
| 6. | E:A      | 60:40       | 27  |                                  |
| 7. | D:A      | 70:30       | 33  | formic acid                      |

The formulations were repeated similarly. This time, 30% of the resin portions A or B were replaced by the dispersions of examples A1, B2 and I3. x dispersion A1; y dispersion B2; z dispersion I3. These baths were then deposited under comparable conditions.

|     | Deposition Equivalent amp × sec./g | Throwing Power (Coverage) cm | 7 Micron Limit cm |
|-----|------------------------------------|------------------------------|-------------------|
| 1.  | 36                                 | 22                           | 12.5              |
| 1x. | 30                                 | 25                           | 15                |
| 2.  | 33                                 | 23                           | 13                |
| 2x. | 27                                 | 26                           | 17.5              |
| 3.  | 40                                 | 20                           | 10                |
| 3y. | 33                                 | 24                           | 14                |
| 4.  | 35                                 | 24                           | 13                |
| 4x. | 29                                 | 27                           | 18                |
| 5.  | 32                                 | 27                           | 16                |
| 5x. | 25                                 | 27                           | 23                |
| 6.  | 30                                 | 27                           | 17                |
| 6x. | 23                                 | 27                           | 22                |

7. A 30:70 (solids content) mixture was prepared from the vehicles of Examples A and D and a portion of the solvent was distilled off carefully under vacuum. After the addition of formic acid (40 MEQ), a dispersion is prepared with a solids content of 40%. A cathode dip-coat bath was prepared from 1,350 g of this mixture, 900 g of fully deionized water and 540 g of pigment paste P1 and then diluted with water to a solids content of 18%.

7x. A bath was prepared as in 7, in which the A resin portion was replaced by an aliquot portion of A1.

7z. An enamel was prepared as in 7, in which the amount of A resin was replaced by a corresponding amount of I3.

|     | MEQ mmoles/100 g of solids | Coverage cm | 7 Micron Limit cm |
|-----|----------------------------|-------------|-------------------|
| 7.  | 30                         | 25          | 9                 |
| 7x  | 29                         | 27          | 13                |
| 7z  | 30                         | 27          | 11                |

The throwing power was determined by dipping two parallel metal sheets 4 mm apart, which were connected at the sides by a nonconducting material, into the enamel to a depth of 27 cm. A coounterelectrode was mounted at a distance of 5 cm. The coverage of the coating and the distance from the lower side, at which the thickness of the film was 7 microns, were determined.

We claim:

1. An aqueous solution or dispersion of a vehicle for an aqueous cataphoretic coating material, the solution or dispersion containing one or more acid-neutralized, basic, film forming resins, an organic solvent, and one or more cross linking agents for the film forming resins, the aqueous solution or dispersion being obtained by first initially separately preparing the following components A) and B) before mixing same:

A) from 95% to 50% by weight solids basis of an aqueous solution or dispersion of one or more, neutralized, basic, film forming resins having a resin solids content of from 25% to 55% by weight, and an organic solvent content of more than 4% by weight, both based on the total solution or dispersion, and a minimum film forming temperature of less than 30° C., and one or more cross linking agents for the film forming resins of the components A) and B), and B) from 5 to 50% by weight solids basis of an aqueous solution or dispersion of one or more acid-neutralized, basic, film forming resins having a resin solids content of from 25 to 55% by weight, and an organic solvent content of less than 3% by weight, both based on the total solution or dispersion, and a minimum film forming temperature of at least 27° C., there being an at least 10° C. difference between the minimum film forming temperatures of the solutions or dispersions A) and B).

2. The aqueous vehicle of claim 1, characterized in that the minimum film forming temperature of dispersion B) is at least 33° C.

3. The aqueous vehicle of claim 1, characterized in that the organic solvent content of dispersion B) is not more than 1% by weight.

4. The aqueous vehicle of claim 1, characterized in that the basic film-forming resins of the aqueous solutions dispersions A) and B) are resins of the same chemical structure.

5. The aqueous vehicle of claim 1, characterized in that basic film-forming resins of different chemical structure are present in the aqueous solutions or dispersions A) and B).

6. The aqueous vehicle of claim 1, characterized in that the basic film-forming resin contained in the aqueous solution or dispersion A) and/or B) is an aminoepoxide resin.

7. The aqueous vehicle of claim 6, characterized in that the aqueous solutions or dispersions A) and B) contain aminoepoxide resins of the same chemical structure 8. The aqueous vehicle of claim 1, characterized in that the aqueous solution or dispersion of component B) was obtained by the removal of the solvent portion in excess of 3% by weight by distillation, azeotropic distillation, ultrafiltration, electrodialysis or reverse osmosis from the aqueous solution or dispersion of the neutralized basic film-forming resin.

9. The aqueous vehicle of claim 8, characterized in that the aqueous solution or dispersion of component B) was obtained by the removal of the solvent portion in excess of 3% by weight from the aqueous solution or dispersion of component A).

10. The aqueous vehicle of claim 9, characterized in that the resin of components A) and B) is an aminoepoxide resin of the same chemical structure.

11. An aqueous coating material, containing the aqueous solutions or dispersions of claim 1 as vehicle, together with enamel additives, pigments, fillers and/or additional organic solvents.

12. The process of coating an electrically conductive substrate which comprises appplying the coating material of claim 1 by cathodic deposition.

* * * * *